(12) United States Patent
Kim

(10) Patent No.: US 9,196,880 B2
(45) Date of Patent: Nov. 24, 2015

(54) BATTERY MODULE WITH OFFSET BATTERY CELLS

(75) Inventor: Myung-Chul Kim, Yongin-si (KR)

(73) Assignees: SAMSUNG SDI CO., LTD., Yongin-si, Gyeonggi-Do (KR); ROBERT BOSCH GmbH, Stuttgart (DE)

( * ) Notice: Subject to any disclaimer, the term of this patent is extended or adjusted under 35 U.S.C. 154(b) by 709 days.

(21) Appl. No.: 13/190,743

(22) Filed: Jul. 26, 2011

(65) Prior Publication Data

US 2012/0189902 A1    Jul. 26, 2012

Related U.S. Application Data

(60) Provisional application No. 61/436,315, filed on Jan. 26, 2011.

(51) Int. Cl.
*H01M 2/10* (2006.01)
*H01M 2/20* (2006.01)
*H01M 10/04* (2006.01)

(52) U.S. Cl.
CPC ........... *H01M 2/1022* (2013.01); *H01M 2/1061* (2013.01); *H01M 2/1072* (2013.01); *H01M 2/202* (2013.01); *H01M 10/04* (2013.01); *H01M 10/0481* (2013.01)

(58) Field of Classification Search
CPC ............ H01M 2/0426; H01M 2/0232; H01M 2/0217; H01M 2/023; H01M 2/0225; H01M 2/022; H01M 2/027; H01M 2/046; H01M 2/0473; H01M 2/202; H01M 2/206; H01M 2/305; H01M 2/1061; H01M 2/1066
USPC .................................................. 429/179, 157
See application file for complete search history.

(56) References Cited

U.S. PATENT DOCUMENTS

| | | | |
|---|---|---|---|
| 6,399,238 B1 | 6/2002 | Oweis et al. | |
| 7,332,243 B2 * | 2/2008 | Cummins et al. | 429/163 |
| 7,935,438 B2 | 5/2011 | Kim | |
| 2004/0170888 A1 | 9/2004 | Cummins et al. | |
| 2005/0250006 A1 * | 11/2005 | Kim | 429/160 |
| 2006/0115721 A1 * | 6/2006 | Lee et al. | 429/156 |
| 2008/0049057 A1 | 2/2008 | Ochiai et al. | |

FOREIGN PATENT DOCUMENTS

| | | |
|---|---|---|
| EP | 0716460 B1 | 3/1999 |
| EP | 1109237 A1 | 6/2001 |
| JP | 03-526670 B2 | 5/2004 |
| KR | 10-2005-0106540 A | 11/2005 |
| KR | 10-2006-0018326 A | 3/2006 |

OTHER PUBLICATIONS

Machine translation of JP 2008-091183, Okada et al., Apr. 17, 2008.*
European Search Report in EP 11187616.5-2119, dated Jan. 19, 2012 (Kim).
Chinese Office Action for 201110461248.4 dated Mar. 17, 2015; Kim.

* cited by examiner

*Primary Examiner* — Maria J Laios
*Assistant Examiner* — Robert S Carrico
(74) *Attorney, Agent, or Firm* — Lee & Morse, P.C.

(57) ABSTRACT

A battery module including a plurality of battery cells, the battery cells being stacked along a first direction, wherein the battery cells are alternately offset in a second direction, the second direction being perpendicular to the first direction.

16 Claims, 8 Drawing Sheets

BATTERY MODULE WITH OFFSET BATTERY CELLS

CROSS-REFERENCE TO RELATED APPLICATION

The present application claims priority under 35 U.S.C. §119(e) to U.S. Provisional Application No. 61/436,315, filed on Jan. 26, 2011, and entitled: "Battery Module," which is incorporated herein by reference in its entirety.

BACKGROUND

1. Field

Embodiments relate to a battery module.

2. Description of the Related Art

A secondary battery may be used as an energy source for, e.g., mobile devices, electric cars, hybrid vehicles, power suppliers, and the like. The secondary battery may have a variously modified form depending on a type of external device using the battery.

Small mobile devices, e.g., mobile phones, may operate for a predetermined period of time using output and capacity of a single battery. However, electric cars, hybrid vehicles, and the like (which consume a great amount of electricity and operate for a long time with high power) may employ a battery cell having high output and capacity. For example, a plurality of battery cells may be electrically connected to constitute a battery module having a high capacity. The battery module may have high output voltage or output current that depends on a number of battery cells.

SUMMARY

Embodiments are directed to a battery module.

The embodiments may be realized by providing a battery module including a plurality of battery cells, the battery cells being stacked along a first direction, wherein the battery cells are alternately offset in a second direction, the second direction being perpendicular to the first direction.

Each battery cell may include an electrode terminal, the electrode terminal of one of the battery cells being electrically connected to the electrode terminal of an adjacent battery cell with a bus bar, and the bus bar may extend at an angle relative to the first direction.

The angle may be about 30 to about 60 degrees.

The battery cells may be alternately offset in a zig-zag configuration along the first direction.

Each battery cell may include a plurality of electrode terminals, the electrode terminals of the plurality of battery cells being alternately offset relative to one another in the second direction.

The electrode terminals may be alternately offset in a zig-zag configuration along the first direction.

The alternately offset battery cells may define regularly spaced open regions between alternate battery cells.

The battery module may further include at least one spacer, wherein the at least one spacer is disposed in one of the open regions between the battery cells.

A size and shape of the at least one spacer may correspond to a size and shape of the open regions between the battery cells.

The embodiments may also be realized by providing a battery module including a plurality of battery cells, the battery cells being stacked along a first direction to define regularly spaced open regions between alternate battery cells, a battery module housing accommodating the battery cells, the battery module housing including end plates, and a connecting member connecting the end plates, the connecting member including a side bracket and a bottom bracket, wherein the battery cells are alternately offset in a second direction, the second direction being perpendicular to the first direction.

The battery module may further include at least one spacer, wherein the at least one spacer is disposed in one of the open regions between the battery cells.

The connecting member may include a pair of facing side brackets at respective sides of the end plates, and the battery module may include a plurality of spacers on both side brackets in an alternating array, the spacers on one of the side brackets being staggered in the first direction relative to the spacers on another of the side brackets.

The at least one spacer may be integrally formed with the side bracket.

The connecting member may be integrally formed with the end plates.

The at least one spacer may be integrally formed with the connecting member.

A size and shape of the at least one spacer may correspond to a size and shape of the open regions between the battery cells.

Each battery cell may include an electrode terminal, the electrode terminal of one of the battery cells being electrically connected to the electrode terminal of an adjacent battery cell with a bus bar, and the bus bar may extend at an angle relative to the first direction.

The angle may be about 30 to about 60 degrees.

The battery cells may be alternately offset in a zig-zag configuration along the first direction.

Each battery cell may include a plurality of electrode terminals, the electrode terminals of the plurality of battery cells being alternately offset relative to one another in the second direction.

The embodiments may also be realized by providing a battery module, comprising: a plurality of battery cells, the battery cells being stacked along a first direction, wherein the battery cells are alternately offset in a second direction, the second direction being perpendicular to the first direction, and further wherein: one of a plurality of electrode terminals of one of the battery cells is electrically connected to one of a plurality of electrode terminals of an adjacent battery cell with a bus bar, the bus bar extending at an angle relative to the first direction, each battery cell includes a top side having opposing short ends, the plurality of electrode terminals of each battery cell being spaced at a same distance from the opposing short ends of the top side, the battery cells are alternately offset in the second direction such that surfaces of the short ends of a first group of alternate battery cells extending in a third direction perpendicular to both the first direction and the second direction share a common plane, a second group of alternate battery cells adjacent to the first group of the alternate battery, cells share a common plane, the common plane shared by the first group of the alternate battery cells is different from the common plane shared by the second group of the alternate battery cells adjacent thereto, and the plurality of electrode terminals of the plurality of battery cells are alternately offset relative to one another in the second direction.

The embodiments may also be realized by providing a battery module, comprising: a plurality of battery cells, the battery cells being stacked along a first direction to define regularly spaced open regions between alternate battery cells, a battery module housing accommodating the battery cells, the battery module housing including: end plates, and a connecting member connecting the end plates, the connecting member including a side bracket and a bottom bracket, wherein the battery cells are alternately offset in a second direction, the second direction being perpendicular to the first direction, and further wherein: one of a plurality of electrode terminals of one of the battery cells is electrically connected to one of a plurality of electrode terminals of an adjacent battery cell with a bus bar, the bus bar extending at an angle relative to the first direction, each battery cell includes a top side having opposing short ends, the plurality of electrode terminals of each battery cell being spaced at a same distance from the opposing short ends of the top side, the battery cells are alternately offset in the second direction such that surfaces of the short ends of a first group of alternate battery cells extending in a third direction perpendicular to both the first direction and the second direction share a common plane, a second group of alternate battery cells adjacent to the first group of the alternate battery cells share a common plane, the common plane shared by the first group of the alternate battery cells is different from the common plane shared by the second group of the alternate battery cells adjacent thereto, and the plurality of electrode terminals of the plurality of battery cells are alternately offset relative to one another in the second direction.

BRIEF DESCRIPTION OF THE DRAWINGS

The embodiments will become more apparent to those of ordinary skill in the art by describing in detail exemplary embodiments with reference to the attached drawings, in which.

DETAILED DESCRIPTION

Figure 1:
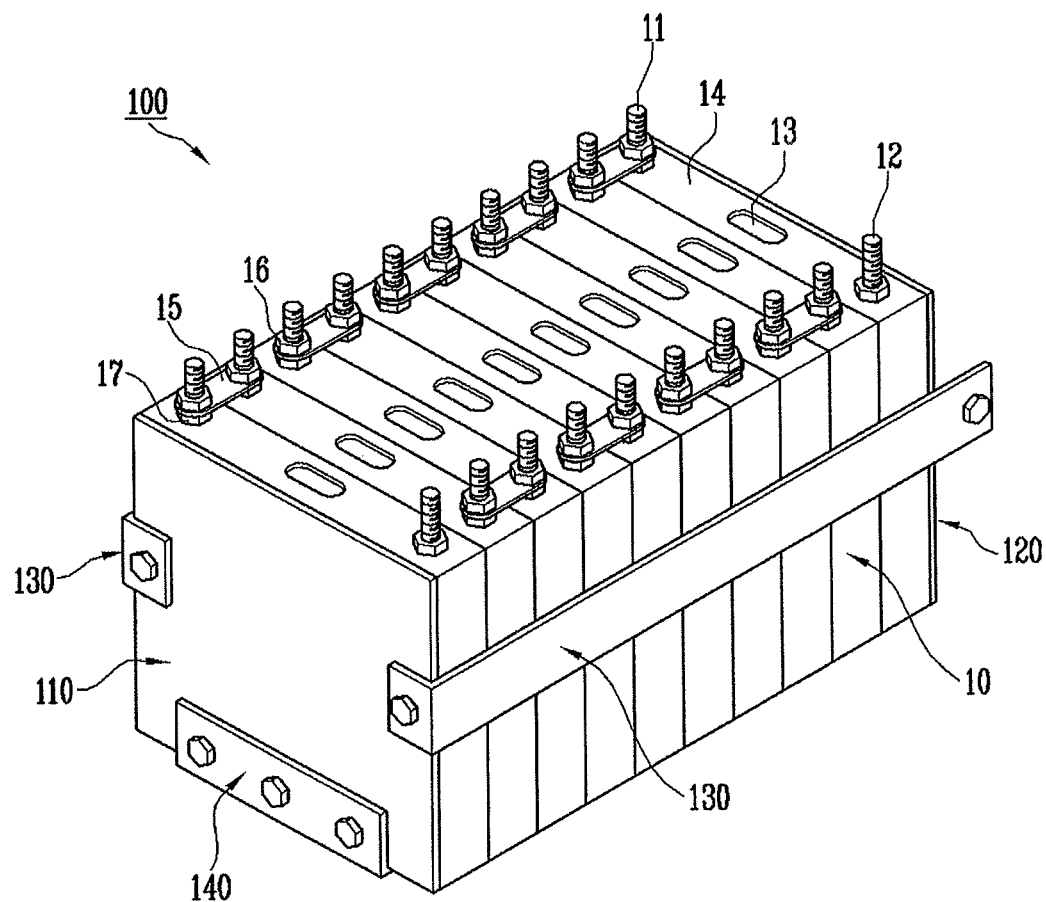
FIG. 1 illustrates a perspective view of a battery module.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. Further, it will be understood that when an element is referred to as being "under" another element, it can be directly under, and one or more intervening elements may also be present. In addition, it will also be understood that when an element is referred to as being "between" two elements, it can be the only element between the two elements, or one or more intervening elements may also be present. Like reference numerals refer to like elements throughout.

FIG. 1 illustrates a perspective view of a battery module.

Referring to FIG. 1, the battery module 100 may include a plurality of battery cells 10 arranged in one direction. A positive terminal 11 and a negative terminal 12 (which protrude from an upper side of the battery cells 10) may be inserted into a bus bar 15 and may be coupled by tightening a nut 16. Accordingly, the battery cells 10 may be electrically connected.

A pair of end plates 110 and 120 may be disposed on the battery cells 10 at opposite ends thereof. The pair of end plates 110 and 120 may be coupled to each other by a connecting member to press the plurality of battery cells 10. In an implementation, the connecting member may include a side bracket 130 and a bottom bracket 140. The battery cells may include a vent 13, which functions to discharge gas generated in the battery cells 10.

In the battery module 100 described above, positive terminals 11 and negative terminals 12 may be alternately disposed in a row in an arranging direction of the battery cells 10. In the battery module 100, an interval between a positive terminal 11 of one battery cell 10 and a negative terminal 12 of a neighboring battery cell 10 may be substantially narrow. Furthermore, as the battery cells 10 become thinner, the interval becomes even narrower.

Thus, a tool or component (used to couple electrode terminals of neighboring battery cells 10 with the bus bar 15) may contact an electrode terminal of another battery cell 10, thereby causing a short circuit.

To prevent such a short circuit, an interval between battery cells 10 may be widened or increased to secure safety, thereby increasing a size of the battery module 100.

Figure 2:
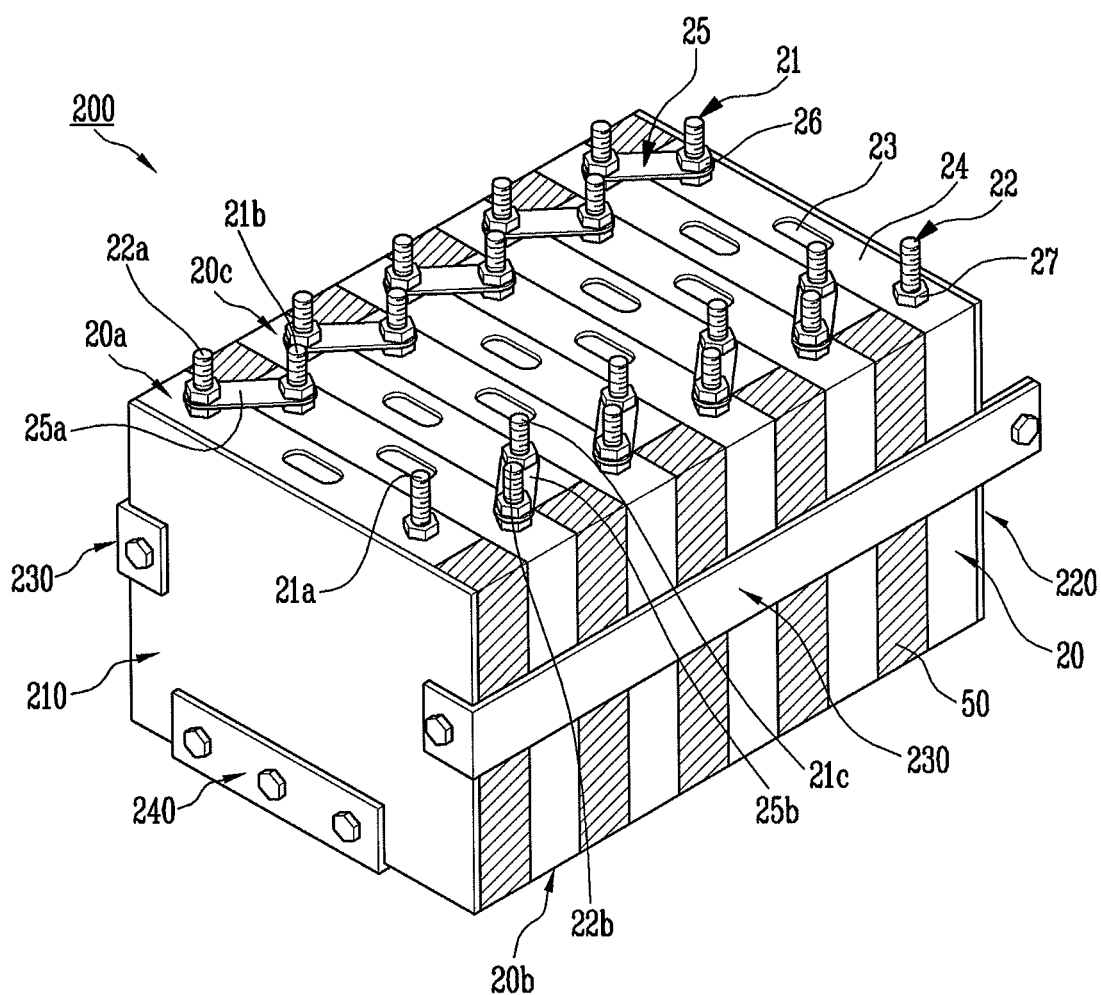
FIG. 2 illustrates a perspective view of a battery module according to an embodiment.
Figure 3:
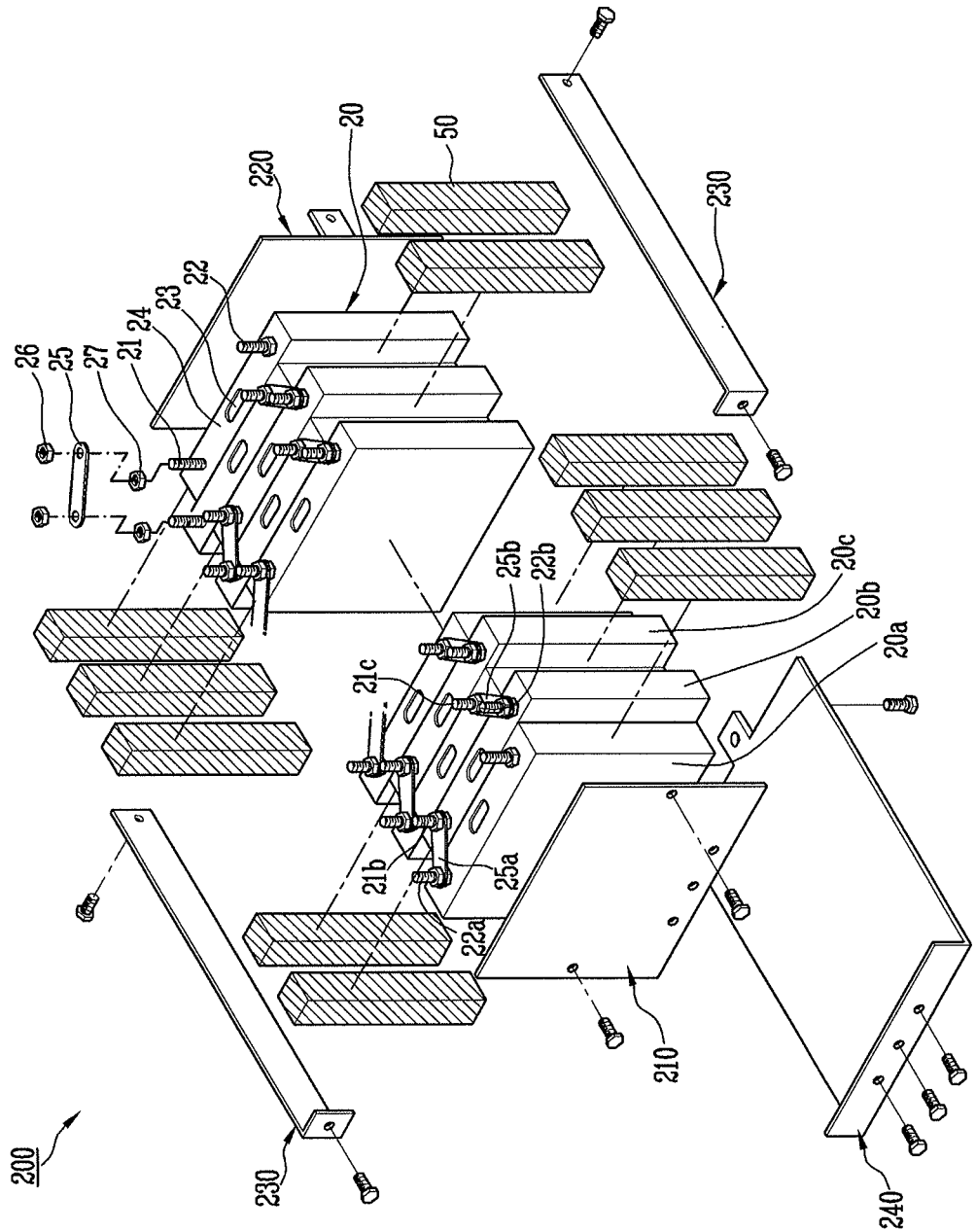
FIG. 3 illustrates an exploded perspective view of the battery module of FIG. 2.

FIG. 2 illustrates a perspective view of a battery module according to an embodiment. FIG. 3 illustrates an exploded perspective view of the battery module of FIG. 2.

Referring to FIGS. 2 and 3, the battery module 200 according to the present embodiment may be a high capacity battery module and may include a plurality of battery cells 20, a bus bar 25 electrically connecting the battery cells 20, a housing 210, 220, 230, and 240 accommodating the battery cells 20, and a spacer 50. In an implementation, the battery cells 20 may be angular or prismatic battery cells.

The plurality of battery cells 20 are arranged in one direction, in a zigzag shape. For example, the battery cells may be stacked along a first direction and alternately offset in a second direction, the second direction being different from the first direction. In an implementation, the second direction may be perpendicular to the first direction. The battery cells 20 may be arranged unevenly in a parallel direction with respect to a bottom side thereof so that wider sides face each other in a zigzag shape. Two terminals (including a positive terminal 21 and a negative terminal 22) may be disposed at a predetermined interval and may protrude from a cap assembly 24 on a top side of each battery cell 20. In an implementation, the positive terminal 21 and the negative terminal 22 may have a bolt shape in which an external surface is formed with a screw thread.

The positive terminal 21 and the negative terminal 22 of the battery cell 20 may be spaced at a same distance from opposite ends of the top side of the cap assembly 24. Accordingly, a negative terminal 22a of one battery cell 20a and a positive terminal 21b of a neighboring battery cell 20b may be disposed diagonally to each other with respect to an arranging direction of the plurality of battery cells 20. For example, each battery cell 20 may include an electrode terminal, the electrode terminal of one of the battery cells 20 being electrically connected to the electrode terminal of an adjacent battery cell 20 with a bus bar 25, and the bus bar 25 may extend at an angle relative to the first direction. In an implementation, the angle may be about 30 to about 60 degrees.

When electrode terminals 21a and 22a of one battery cell 20a are disposed diagonally relative to electrode terminals 22b and 21b of the neighboring battery cell 20b, the electrode terminals may not be spaced at the same distance from the opposite ends of the cap assembly 24 to a center of the battery module 200.

The positive terminal 21a and the negative terminal 22a of one battery cell 20a may be unevenly disposed relative to the positive terminal 21b and the negative terminal 22b of the neighboring battery cell 20b. Accordingly, in the battery module 200, positive terminals 21 and negative terminal 22 may be alternately disposed on opposite sides relative to a center of the top side of the battery cell 20. Further, the plurality of battery cells 20 may be arranged in an offset of zigzag shape or configuration. Thus, a space may be formed on a lateral side of each battery cell 20. Accordingly, the battery module 200 may maintain the arrangement in a zigzag shape. For example, the alternately offset battery cells 20 may define regularly spaced open regions between alternate battery cells 20.

For example, the negative terminal 22a of the one battery cell 20a may be arranged diagonally relative to the positive terminal 21b of the neighboring battery cell 20b with respect to the arranging direction of the battery cells 20. A bus bar 25a may be diagonally coupled with the positive terminal 21b of the battery cell 20a and the negative terminal 22a of the neighboring battery cell 20b with respect to the arranging direction of the battery cells 20, and electrically connects the battery cells 20a and 20b.

The positive terminal 21b and the negative terminal 22a may be in the form of a male screw protruding outwardly on the cap assembly 24. A nut 27 may be coupled and tightened with the positive terminal 21b and the negative terminal 22a to be fixed on the cap assembly 24. The bus bar 25a may be coupled with the negative terminal 22a of the battery cell 20a and the positive terminal 21b of the neighboring battery cell 20b and may be seated on the nut 27. Then, a nut 26 may be coupled and tightened with each of the positive terminal 21b and the negative terminal 22a protruding through the bus bar 25a to fix a position of the bus bar 25a.

As described above, the neighboring battery cells 20a and 20b may be connected by the bus bar 25a; and the battery cell 20b and another neighboring battery cell 20c may be connected to each other using another bus bar 25b. For example, the negative terminal 22b of the battery cell 20b and a positive terminal 21c of the other battery cell 20c may be inserted into the bus bar 25b. Then, a nut 26 may be coupled and tightened with each of the positive terminal 21c and the negative terminal 22b protruding through the bus bar 25b to fix the bus bar 25b.

Accordingly, the positive terminals 21 and the negative terminals of the respective battery cells 20 may be electrically connected to each other through the bus bars 25. For example, the negative terminal 22a of the one battery cell 20a may be connected to the positive terminal 21b of the neighboring battery cell 20b through the bus bar 25a. Then, the negative terminal 22b of the battery cell 20b may be connected to the positive terminal 21c of the other neighboring battery cell 20c through the different bus bar 25b. Connection of the battery cells 20 in series may form a structure of the battery module 200 in which the plurality of battery cells 20 and the plurality of bus bars 25 are repeatedly used.

Hereinafter, the housing 210, 220, 230, and 240 of the battery module 200 will be further described.

The housing 210, 220, 230, and 240 may include a pair of end plates 210 and 220 (outside the battery cells 20) and connecting members 230 and 240 (connecting the pair of end plates 210 and 220).

The battery cells 20 may be arranged in a first direction in a space formed by the pair of end plates 210 and 220 and the connecting members 230 and 240. The battery cells 20 may be arranged such that wider sides face each other in a zigzag or offset configuration. Accordingly, the negative terminal 22a of the one battery cell 20a may be electrically connected to the positive terminal 21b of the neighboring battery cell 20b through the bus bar 25a (the bus bar 25a being coupled diagonally with respect to the first direction). The bus bar 25a may include holes through which the positive terminal 21b and the negative terminal 22a pass; and the bus bar 25a connected with the terminals 21b and 22a via passing may be fixed by a nut or the like.

The connecting members 230 and 240 may include a side bracket 230 (supporting opposite lateral sides of the battery cells 20) and a bottom bracket 240 (supporting a bottom side of the battery cells 20). The respective brackets 230 and 240 may be coupled with the end plates 210 and 220 at respective ends of the battery module 200. In an implementation, the end plates 210 and 220, the side bracket 230, and the bottom bracket 240 may be coupled using, e.g., a bolt and a nut.

The respective end plates 210 and 220 may be in surface-contact with outermost battery cells 20 to thereby press the plurality of battery cells 20 inwardly. In an implementation, the battery cells 20 supported by the end plates 210 and 220, the side bracket 230, and the bottom bracket 240 may be connected in series, with the positive terminals 21 and the negative terminals 22 being alternately disposed.

The housing 210, 220, 230, and 240 may stably fix a position of the battery cells 20. Thus, the housing 210, 220, 230, and 240 may not be limited to the structure described herein but may be modified variously. Further, a connecting structure and a number of the battery cells 20 may be changed variously based on a design of the battery module 200.

The battery cells 20 may be arranged in the zigzag or offset configuration; and a spacer 50 may be formed in the space to widen an interval between a positive terminal 21 and a negative terminal 22 of neighboring battery cells 20. For example, at least one spacer 50 may be disposed in one of the open regions between the battery cells 20. In an implementation, the at least one spacer 50 may correspond to a size and shape of the open regions between the battery cells 20. Accordingly, a tool or component used to couple the positive terminals 21 and the negative terminals 22 with the bus bar 25 may be prevented from contacting the positive terminals 21 or the negative terminals 22 to thereby prevent a short circuit.

Moreover, ensuring a safe distance between the battery cells 20 to reduce an interval between the battery cells 20 may not be required, so that the battery module 200 may be formed thinner.

In addition, the interval between the positive terminals 21 and the negative terminals 22 coupled with the bus bars 25 may increase. Thus, heat generated in the bus bars 25 may be easily discharged to or dissipated in a space under the bus bars 25. Further, the bus bars 25 may be coupled in only one direction. Thus, errors in coupling the positive terminals 21 and the negative terminals 22 with the bus bars 25 may decrease, thereby improving process efficiency.

Figure 4:
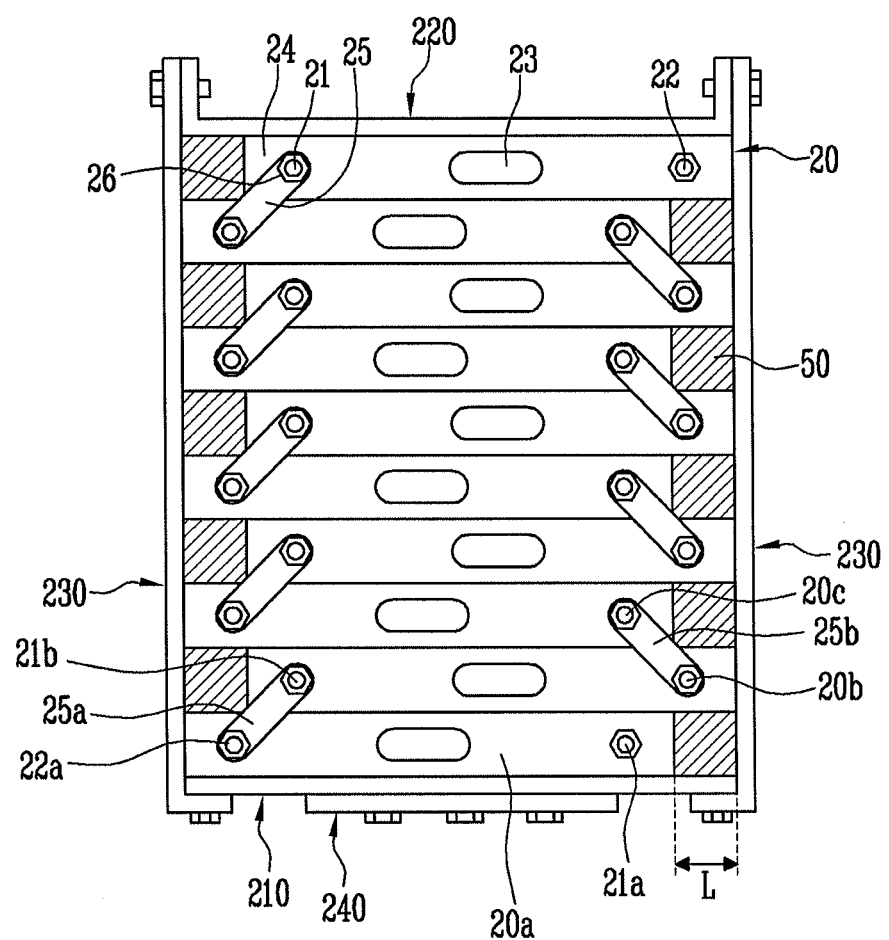
FIG. 4 illustrates a top plan view of the battery module of FIG. 2.

FIG. 4 illustrates a top plan view of the battery module of FIG. 2.

Referring to FIG. 4, the battery cells 20 may be arranged in the first direction, in a zigzag or offset shape or configuration. The spacer 50 may be formed in the space formed on the lateral side of each battery cell 20. Thus, the battery cells 20 may maintain the zigzag or offset shape.

Figure 5:
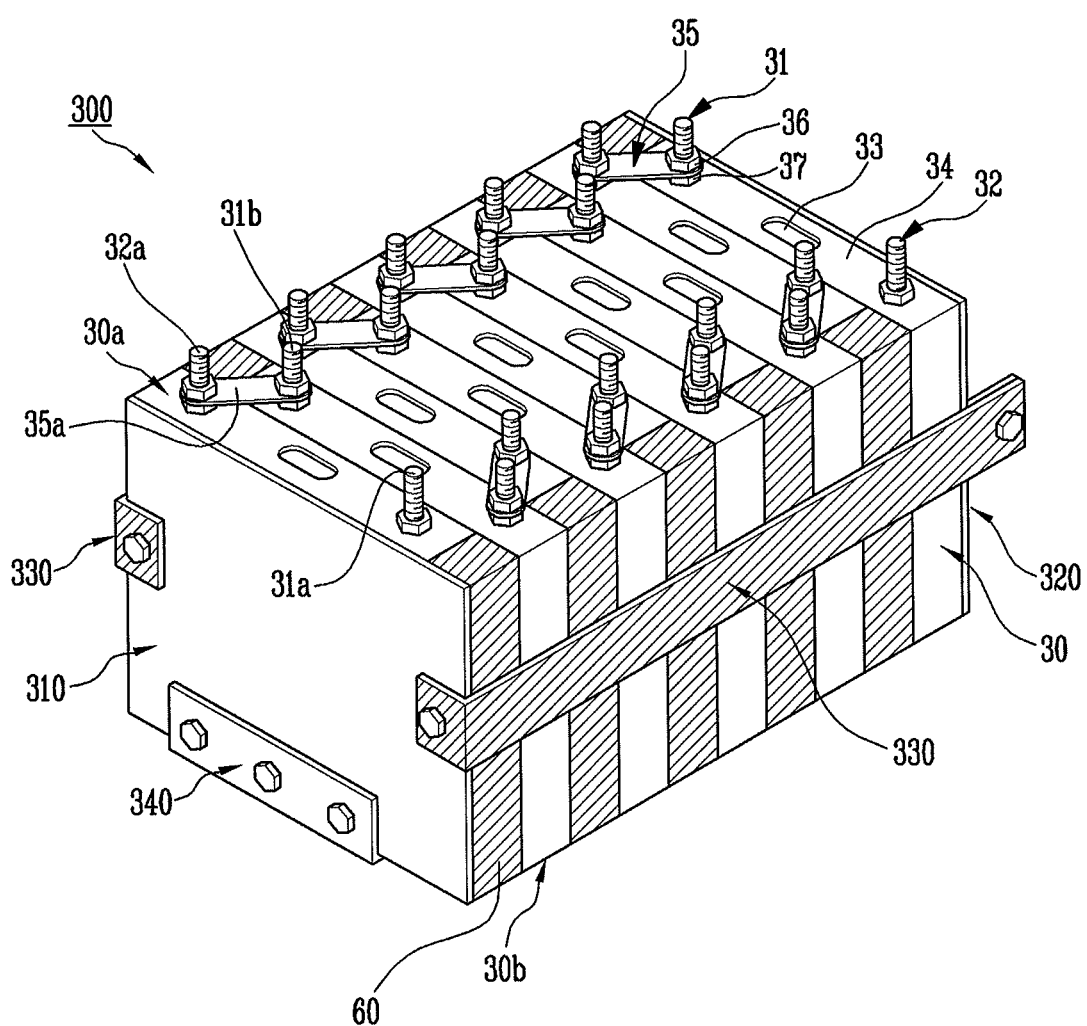
FIG. 5 illustrates a perspective view of a battery module according to another embodiment.
Figure 6:
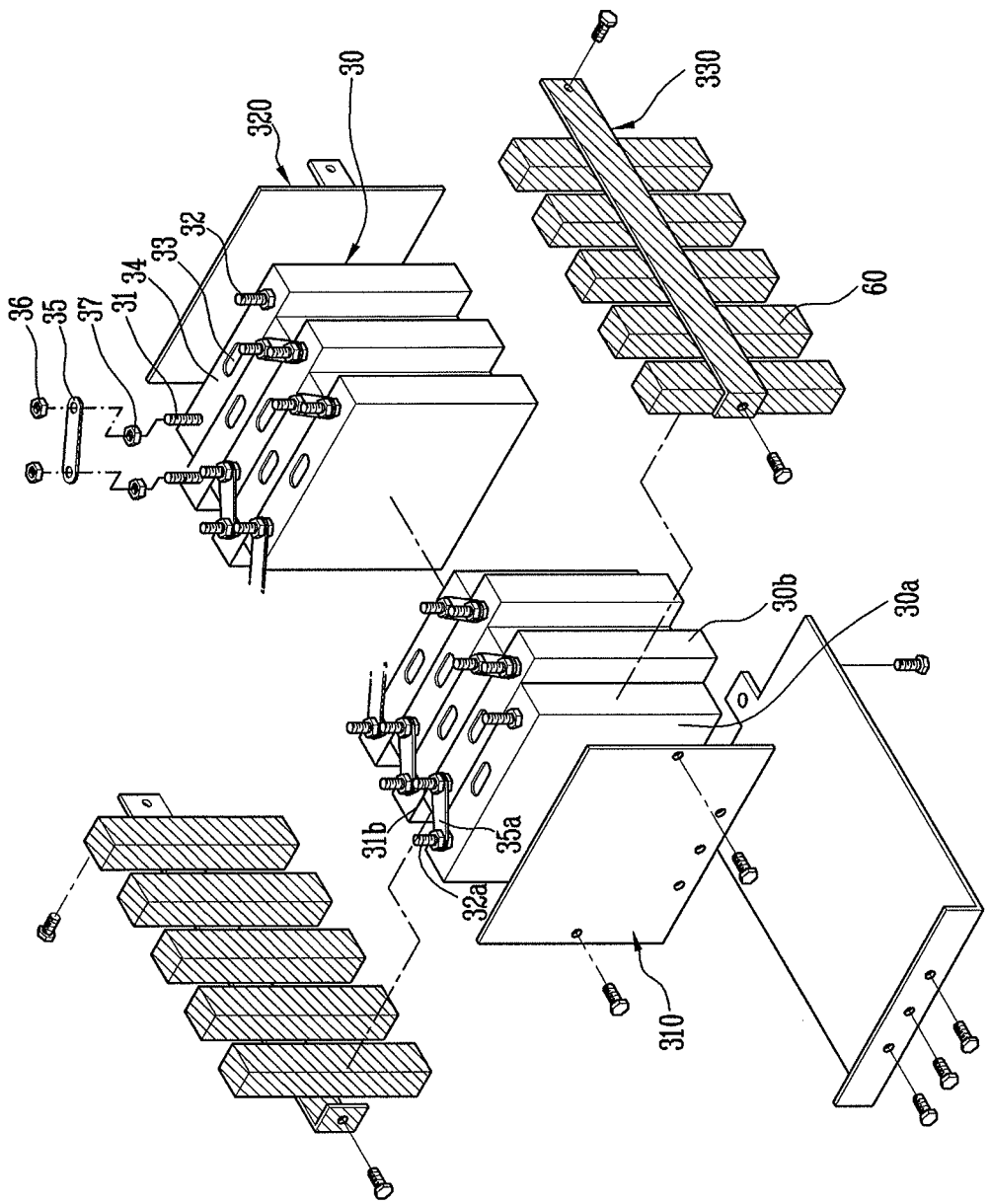
FIG. 6 illustrates an exploded perspective view of the battery module of FIG. 5.

Accordingly, the negative terminal 22a of the battery cell 20a may be diagonally disposed relative to the positive terminal 21b of the neighboring battery cell 20b with respect to the arranging direction of the battery cells 20. Thus, the bus bar 25a may also be disposed diagonally with respect to the arranging direction of the battery cells 20, e.g., the bus bar 25a may extend at an angle relative to the first direction. In an implementation, the angle may be about 30 to about 60 degrees FIG. 5 illustrates a perspective view of a battery module according to another embodiment. FIG. 6 illustrates an exploded perspective view of the battery module of FIG. 5. A repeated description of the same components as in the previous embodiment is omitted.

Referring to FIGS. 5 and 6, the battery module 300 according to the present embodiment may include a plurality of battery cells 30, a bus bar 35 electrically connecting the plurality of battery cells 30, a housing 310, 320, 330, and 340 accommodating the battery cells 30, and a spacer 60.

As described above, the housing 310, 320, 330, and 340 may stably support the battery cells 30. The housing 310, 320, 330, and 340 may include a pair of end plates 310 and 320 (outside the battery cells 30) and connecting members 330 and 340 (connecting the pair of end plates 310 and 320). The connecting members 330 and 340 may include a side bracket 330 (supporting opposite lateral sides of the battery cells 30) and a bottom bracket 340 (supporting a bottom side of the battery cells 30).

In the housing 310, 320, 330, and 340 having the above configuration, the side bracket 330 may be integrated with the spacer 60. Accordingly, the battery cells 30 arranged in a zigzag shape may maintain their configuration due to the spacer 60 integrated with the side bracket 330. Thus, a negative terminal 32a of one battery cell 30a may be disposed diagonally relative to a positive terminal 31b of a neighboring battery cell 30b with respect to an arranging direction of the battery cells 30. For example, a bus bar 35a may be disposed diagonally, e.g., at an angle, with respect to the arranging direction of the battery cells 30, e.g., the first direction.

As described above, the spacer 60 may be integrated with the side bracket 330. Thus, the battery cells 30, even if initially partially misaligned, may be arranged in proper positions when the side bracket 330 is installed.

Figure 7:
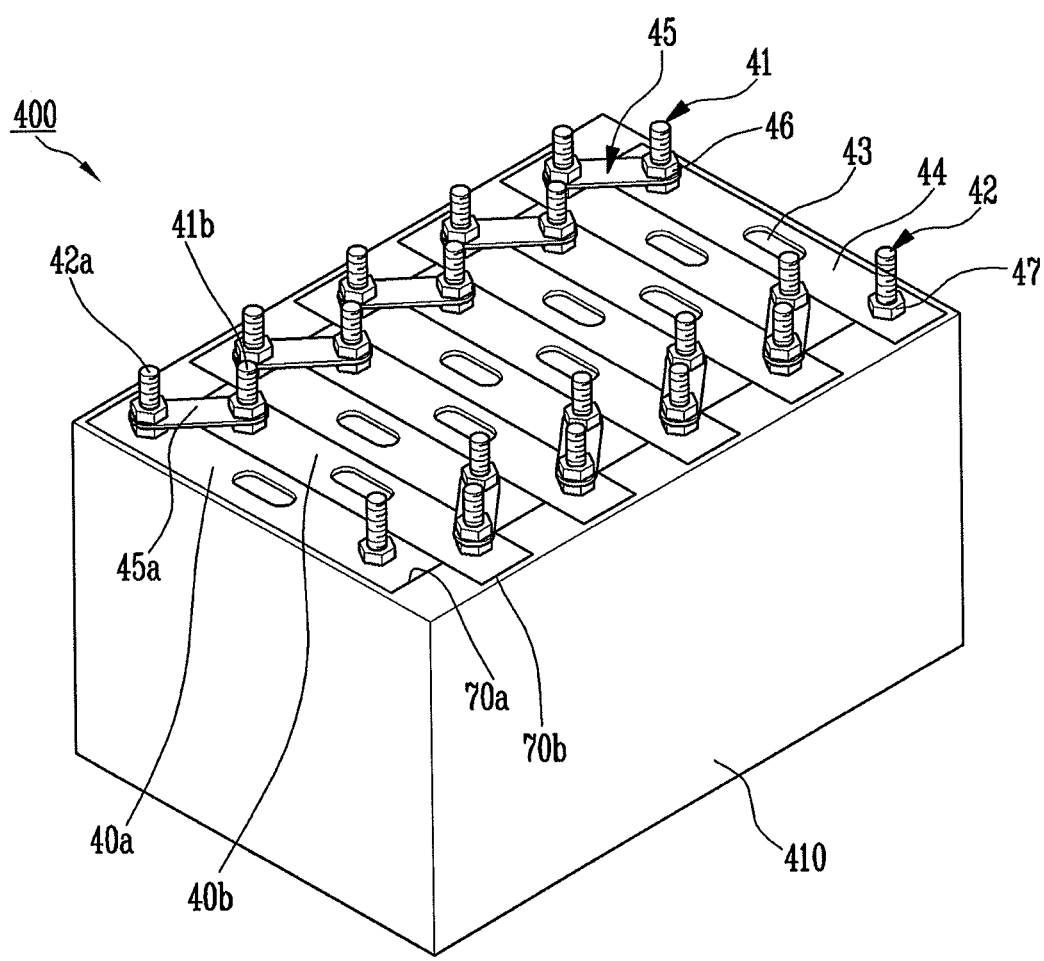
FIG. 7 illustrates a perspective view of a battery module according to yet another embodiment.
Figure 8:
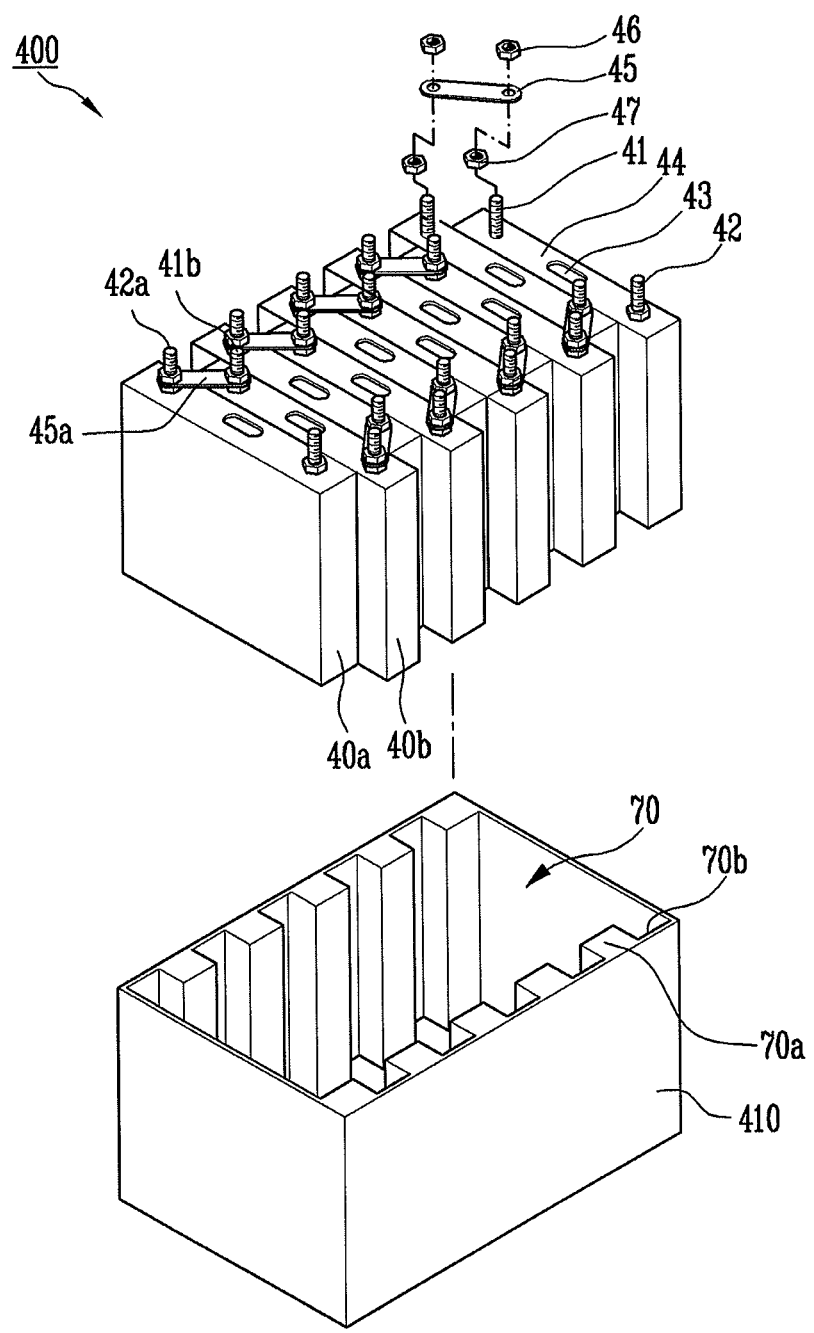
FIG. 8 illustrates an exploded perspective view of the battery module of FIG. 7.

FIG. 7 illustrates a perspective view of a battery module according to yet another embodiment. FIG. 8 illustrates an exploded perspective view of the battery module of FIG. 7. A repeated description of the same components as in the previous embodiment is omitted.

Referring to FIGS. 7 and 8, the battery module 400 according to the present embodiment may include a plurality of battery cells 40, a bus bar 45 electrically connecting the battery cells 40, and a housing 410 accommodating the battery cells 40.

The housing 410 may include a protrusion part 70a and an insertion part 70b on an internal side of the housing 410 to accommodate the battery cells 40 arranged in the zigzag or offset shape. In an implementation, the protrusion part 70a and the insertion part 70b may be alternately formed on opposite internal sides of the housing 410. For example, the protrusion part 70a may be formed on one internal side; and the insertion part 70b may be formed on an opposite internal side. Further, the protrusion part 70a and the insertion part 70b may be alternately formed on the same internal side.

The housing 410 having the above internal structure may facilitate arrangement of the battery cells 40 in the zigzag or offset shape. Further, due to the housing 410, the spacer 50 and 60 may not be included as in the previous embodiments. Thus, the battery cells 40 may be easily arranged in the zigzag or offset shape.

Accordingly, a negative terminal 42a of one battery cell 40a may be disposed diagonally relative to a positive terminal 41b of a neighboring battery cell 40b with respect to an arranging direction of the battery cells 40. Further, a bus bar 45a may also be disposed diagonally, e.g., at an angle, with respect to the arranging direction of the battery cells 40.

The embodiments provide a module having improved safety and process efficiency.

The embodiments also provide a battery module having a configuration that prevents a component or tool (used to couple a bus bar) from contacting a neighboring electrode terminal, so as to reduce the likelihood of, or prevent, a short circuit with the neighboring electrode terminal when the bus bar is coupled with an electrode terminal.

Additionally, the embodiments provide a battery module in which an interval between electrode terminals of neighboring battery cells is increased due to arrangement of a plurality of battery cells in an offset or zigzag shape to ease coupling of a bus bar and so that the battery module is slim and process efficiency is enhanced.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery module, comprising:
   a plurality of battery cells, the battery cells being stacked along a first direction,
   wherein the battery cells are alternately offset in a second direction, the second direction being perpendicular to the first direction, and
   further wherein:
   one of a plurality of electrode terminals of one of the battery cells is electrically connected to one of a plurality of electrode terminals of an adjacent battery cell with a bus bar, the bus bar extending at an angle relative to the first direction,
   each battery cell includes a top side having opposing short ends, the plurality of electrode terminals of each battery cell being spaced at a same distance from the opposing short ends of the top side,
   the battery cells are alternately offset in the second direction such that surfaces of the short ends of a first group of alternate battery cells extending in a third direction perpendicular to both the first direction and the second direction share a common plane,
   a second group of alternate battery cells adjacent to the first group of the alternate battery cells share a common plane, the common plane shared by the first group of the alternate battery cells is different from the common plane shared by the second group of the alternate battery cells adjacent thereto, and the plurality of electrode terminals of the plurality of battery cells are alternately offset relative to one another in the second direction.

2. The battery module as claimed in claim 1, wherein the angle is about 30 to about 60 degrees.

3. The battery module as claimed in claim 1, wherein the battery cells are alternately offset in a zig-zag configuration along the first direction.

4. The battery module as claimed in claim 1, wherein the plurality of electrode terminals are alternately offset in a zig-zag configuration along the first direction.

5. The battery module as claimed in claim 1, wherein the alternately offset battery cells define regularly spaced open regions between alternate battery cells.

6. The battery module as claimed in claim 5, further comprising at least one spacer, wherein the at least one spacer is disposed in one of the open regions between the battery cells.

7. The battery module as claimed in claim 6, wherein a size and shape of the at least one spacer corresponds to a size and shape of the open regions between the battery cells.

8. A battery module, comprising:
a plurality of battery cells, the battery cells being stacked along a first direction to define regularly spaced open regions between alternate battery cells,
a battery module housing accommodating the battery cells, the battery module housing including:
end plates, and
a connecting member connecting the end plates, the connecting member including a side bracket and a bottom bracket,
wherein the battery cells are alternately offset in a second direction, the second direction being perpendicular to the first direction, and
further wherein:
one of a plurality of electrode terminals of one of the battery cells is electrically connected to one of a plurality of electrode terminals of an adjacent battery cell with a bus bar, the bus bar extending at an angle relative to the first direction,
each battery cell includes a top side having opposing short ends, the plurality of electrode terminals of each battery cell being spaced at a same distance from the opposing short ends of the top side,
the battery cells are alternately offset in the second direction such that surfaces of the short ends of a first group of alternate battery cells extending in a third direction perpendicular to both the first direction and the second direction share a common plane,
a second group of alternate battery cells adjacent to the first group of the alternate battery cells share a common plane,
the common plane shared by the first group of the alternate battery cells is different from the common plane shared by the second group of the alternate battery cells adjacent thereto, and
the plurality of electrode terminals of the plurality of battery cells are alternately offset relative to one another in the second direction.

9. The battery module as claimed in claim 8, further comprising at least one spacer, wherein the at least one spacer is disposed in one of the open regions between the battery cells.

10. The battery module housing as claimed in claim 9, wherein:
the connecting member includes a pair of facing side brackets at respective sides of the end plates, and
the battery module includes a plurality of spacers on both side brackets in an alternating array, the spacers on one of the side brackets being staggered in the first direction relative to the spacers on another of the side brackets.

11. The battery module as claimed in claim 9, wherein the at least one spacer is integrally formed with the side bracket.

12. The battery module as claimed in claim 9, wherein the connecting member is integrally formed with the end plates.

13. The battery module as claimed in claim 12, wherein the at least one spacer is integrally formed with the connecting member.

14. The battery module as claimed in claim 9, wherein a size and shape of the at least one spacer corresponds to a size and shape of the open regions between the battery cells.

15. The battery module as claimed in claim 8, wherein the angle is about 30 to about 60 degrees.

16. The battery module as claimed in claim 8, wherein the battery cells are alternately offset in a zig-zag configuration along the first direction.

\* \* \* \* \*